United States Patent
Guthart et al.

(10) Patent No.: US 12,229,666 B2
(45) Date of Patent: Feb. 18, 2025

(54) CONSUMER DEVICE AND METHOD FOR AUTHENTICATING A CONSUMABLE COMPONENT

(71) Applicant: Infineon Technologies AG, Neubiberg (DE)

(72) Inventors: Juergen Guthart, Grafing (DE); Berndt Gammel, Markt-Schwaben (DE)

(73) Assignee: Infineon Technologies AG, Neubiberg (DE)

( * ) Notice: Subject to any disclaimer, the term of this patent is extended or adjusted under 35 U.S.C. 154(b) by 1029 days.

(21) Appl. No.: 17/186,828

(22) Filed: Feb. 26, 2021

(65) Prior Publication Data
US 2021/0271971 A1    Sep. 2, 2021

(30) Foreign Application Priority Data
Feb. 28, 2020 (DE) .......... 102020105357.6

(51) Int. Cl.
| G06F 21/44 | (2013.01) |
| G06F 21/70 | (2013.01) |
| G06N 3/08 | (2023.01) |
| H04L 9/08 | (2006.01) |
| H04L 9/32 | (2006.01) |

(52) U.S. Cl.
CPC .............. *G06N 3/08* (2013.01); *G06F 21/44* (2013.01); *G06F 21/70* (2013.01); *H04L 9/0838* (2013.01); *H04L 9/3252* (2013.01)

(58) Field of Classification Search
CPC .......... G06N 3/08; G06F 21/44; G06F 21/70; H04L 9/0838; H04L 9/3252; H04L 9/3278
See application file for complete search history.

(56) References Cited

U.S. PATENT DOCUMENTS

| 8,782,369 B2 | 7/2014 | Baderdinni et al. | |
| 8,782,396 B2 * | 7/2014 | Ziola | H04L 9/3271 713/155 |
| 9,015,500 B2 * | 4/2015 | Guo | G09C 1/00 726/34 |
| 9,343,135 B2 * | 5/2016 | Zhu | G11C 11/161 |
| 9,619,663 B2 * | 4/2017 | Refstrup | G03G 15/0863 |

(Continued)

OTHER PUBLICATIONS

German Patent Office, Office Action issued for DE 102020105357.6, 9 pgs., dated: Oct. 28, 2020.
(Continued)

*Primary Examiner* — Han Yang
(74) *Attorney, Agent, or Firm* — Banner & Witcoff Ltd.

(57) ABSTRACT

A consumer device is described, comprising a sensor which is adapted to register sensor data that describe a physical behavior of an authentication chip of a consumable component, an authentication circuit which is adapted to implement a machine learning model that is trained to classify consumable components with the aid of sensor data that describe the physical behavior of authentication chips of the consumable components into originals and copies, to deliver the registered sensor data to the machine learning model, and to authorize the use of the consumable component by the consumer device depending on whether the machine learning model classifies the consumable component as original.

20 Claims, 10 Drawing Sheets

(56) References Cited

U.S. PATENT DOCUMENTS

2019/0280885 A1* 9/2019 Afghah .................... G06N 5/02
2019/0369174 A1* 12/2019 Corbett ................. G06K 7/082

OTHER PUBLICATIONS

Wikipedia, "Physical Unclonable Function", 5 pgs., dated: Mar. 23, 2019.
S. Zalivaka, "Physical Unclonable Functions: Protection For Electronics Against Illegal Copying", 6 pgs., dated: Apr. 1, 2019.

* cited by examiner

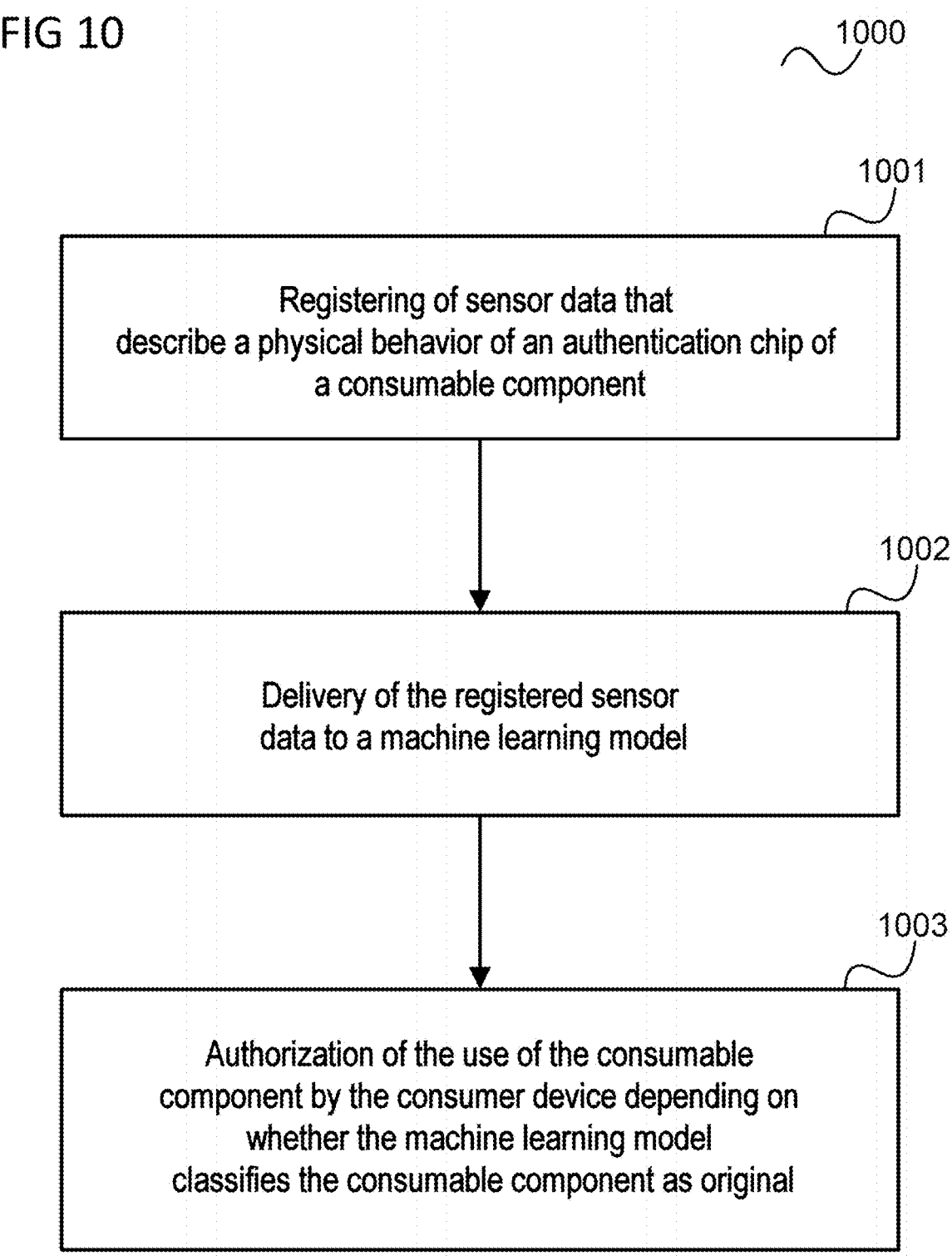

CONSUMER DEVICE AND METHOD FOR AUTHENTICATING A CONSUMABLE COMPONENT

CROSS-REFERENCE TO RELATED APPLICATIONS

The present application claims the benefit of the filing date of German patent application no. DE 102020105357.6, filed on Feb. 28, 2020, the contents of which are incorporated herein by reference in their entirety.

TECHNICAL FIELD

The present disclosure relates in general to consumer devices and to methods for authenticating a consumable component.

BACKGROUND

Copies or forgeries (i.e. non-originals) are an important topic in end user markets with consumables. There is a high risk that copying businesses will make clones of consumable components, which behave just like the original components.

The production of clones of consumable components causes a significant turnover loss for the manufacturer of the original consumable components, typically more than 20%. Examples of markets in which great damage is caused by copiers are consumable materials and substitute products such as printer cartridges, camera batteries, e-cigarette packets, etc.

Typically, authentication chips are used to protect consumable components. In general, their purpose is to establish that a consumable component unit (for example a printer cartridge) can be identified as an original for the host equipment (for example the printer). In this example, the printer would not accept the cartridge and use it for printing until after the printer cartridge has been authenticated, or in the converse case would for example warn the user that it is a non-original cartridge. It may furthermore be the case that the printer manufacturer does not undertake a full guarantee when non-original parts are used.

However, a copier may also copy (clone) such an authentication chip. Measures are therefore desirable to prevent the use of copied consumables having copied authentication chips in original consuming equipment.

SUMMARY

The embodiments described herein are directed to a consumer device comprising a sensor which is adapted to register sensor data that describe a physical behavior of an authentication chip of a consumable component, an authentication circuit which is adapted to implement a machine learning model that is trained to classify consumable components with the aid of sensor data that describe the physical behavior of authentication chips of the consumable components into originals and copies, to deliver the registered sensor data to the machine learning model, and to authorize the use of the consumable component by the consumer device depending on whether the machine learning model classifies the consumable component as original. The embodiments further include a method for authenticating a consumable component corresponding to the consumable device described above.

BRIEF DESCRIPTION OF THE DRAWINGS/FIGURES

The figures do not reproduce the actual size proportions but are intended to be used to illustrate the principles of the various exemplary embodiments. Various exemplary embodiments will be described below in relation to the appended figures.

FIG. 10 shows a flowchart which illustrates a method for authenticating a consumable component according to an embodiment.

DETAILED DESCRIPTION

The following detailed description relates to the appended figures, which show details and exemplary embodiments. These exemplary embodiments are described in sufficient detail so that the person skilled in the art can carry out the embodiments as described throughout the disclosure. Other embodiments are also possible and the exemplary embodiments may be modified from a structural, logical and electrical viewpoint without departing from the subject-matter of the disclosure. The various exemplary embodiments do not necessarily exclude one another, and various embodiments may be combined with one another so that new embodiments are formed. In the scope of this description, the terms "connected", "attached" and "coupled" are used to describe both direct and indirect connection, direct, or indirect attachment and direct or indirect coupling.

There are several strategies for preventing a professional copier from producing counterfeit (copied) products (such as consumable components). One strategy is to connect/embed an authentication circuit (for example an authentication ASIC) to/into the replacement medium (i.e. the consumable component, for example a printer cartridge) and to carry out one-way authentication or mutual authentication from the host side (e.g. from the side of the consuming equipment, for example a printer). This will be described below with reference to FIG. 1 and FIG. 2.

Figure 1:
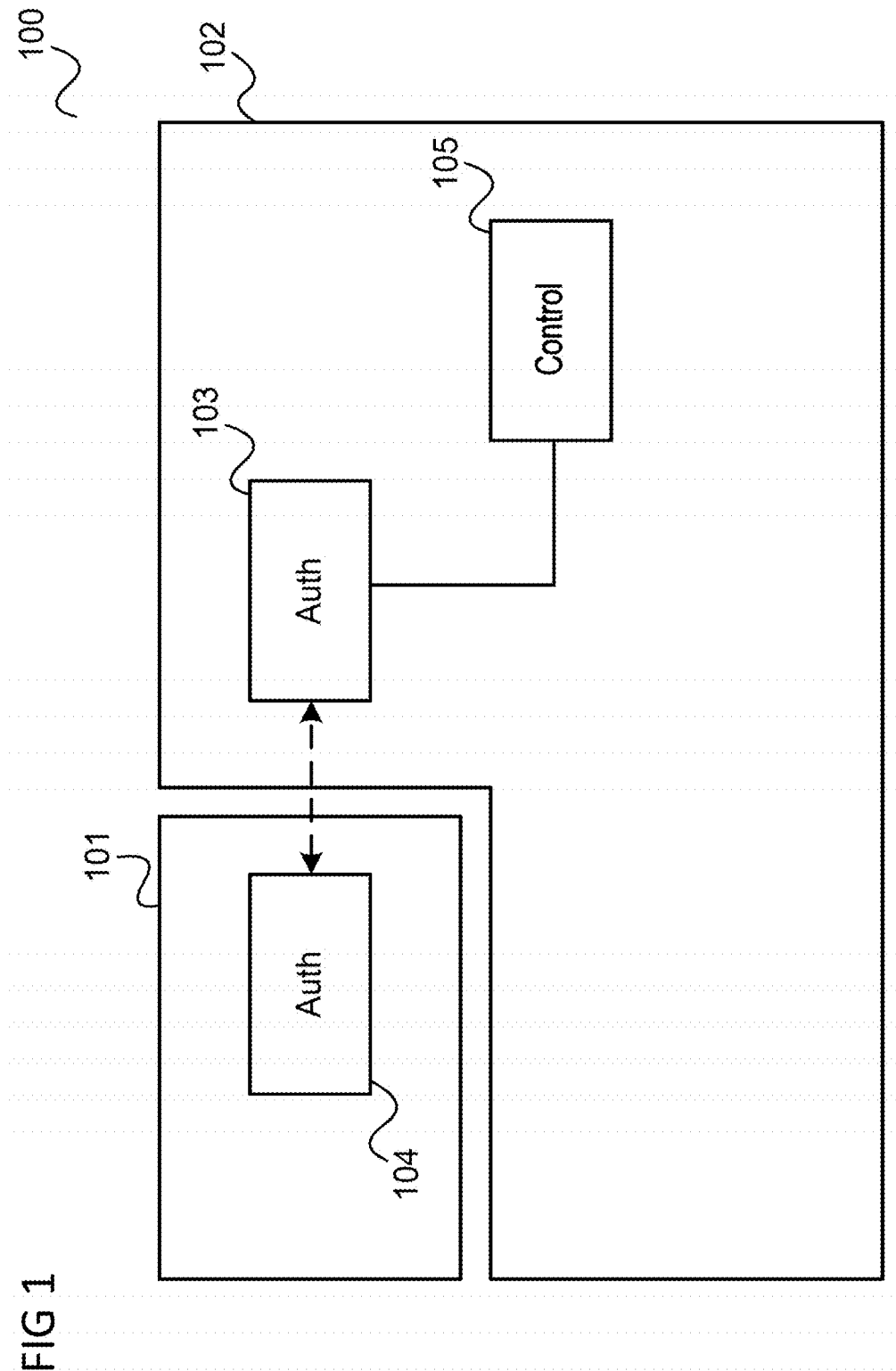
FIG. 1 shows a consumable arrangement.

FIG. 1 shows a consumable arrangement 100 comprising a consumable 101 (also referred to as a consumable component unit) and consuming (or using) equipment 102 (also referred to as a consumer device).

The consumable 101 is a unit which provides (and for example stores) a resource that is consumed during operation of the consuming equipment 102.

For example, the consumable contains a (physical) material which is consumed, as in the case of a printer cartridge, a vaporizer cartridge for insecticides or insect repellents, an e-cigarette refill cartridge or a medicinal substance (for example a drug) for medical equipment in a corresponding container.

Examples of pairings of a consumable 101 and consuming equipment 102 may include:

printer cartridge—printer;

refill cartridge—inhaler;

refill cartridge—insect repellent container, etc.

The consuming equipment 102 may, however, also be a vehicle or a camera (for example, the consumable component is then a battery).

The consumable 101 is for example physically connected to the consuming equipment 102, for example inserted or installed. The consumable 101 is typically connected replaceably (in particular releasably) to the consuming equipment 102.

The manufacturer of consuming equipment 102 typically wishes that only consumables 101 which are produced by them (or a licensee) may be used with the consuming equipment 102.

The consuming equipment 102 may therefore comprise a host authentication circuit 103, against which a consumable authentication circuit 104 must be authenticated. The consuming equipment 102 comprises, for example, a control device 105 which allows (authorizes) operation of the consuming equipment 102 (also referred to as the host) with the consumable 101 only if the consumable 101 has successfully been authenticated by means of a consumable authentication circuit 104 with the host authentication circuit 103 of the consuming equipment 102.

Figure 2:
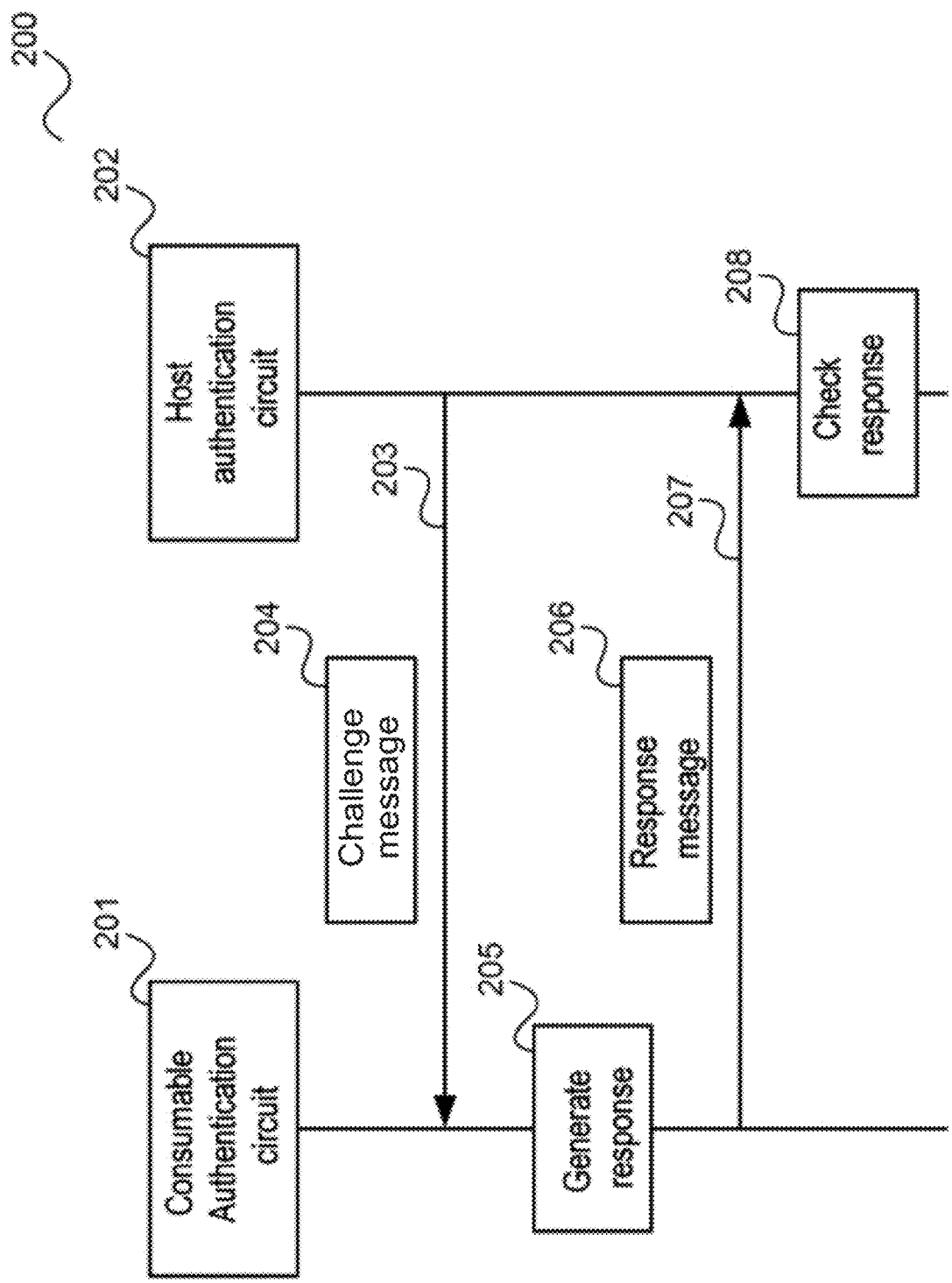
FIG. 2 shows a flowchart of the authentication of a consumable authentication circuit with a host authentication circuit.

FIG. 2 shows a flowchart 200 of the authentication of a consumable authentication circuit 201 with a host authentication circuit 202.

The consumable authentication circuit 201 and the host authentication circuit 202 respectively correspond, for example, to the consumable authentication circuit 104 and the host authentication circuit 103 of FIG. 1.

In order to authenticate the consumable authentication circuit 201 with the host authentication circuit 202, in 203 the host authentication circuit 202 sends a challenge message 204 to the consumable authentication circuit 201. In 205, the consumable authentication circuit 201 generates a response, which it transmits in the form of a response message 206 in 207 to the host authentication circuit 202. In 208, the host authentication circuit 202 verifies that the response is correct, for example corresponding to the challenge, and authenticates the consumable authentication circuit 201 if this is the case.

For example, the host authentication circuit 202 inserts a random number into the challenge message 204, on the basis of which number the consumable authentication circuit 201 must generate the response correctly in order to be authenticated by the host authentication circuit 202. For example, the authentication is based on elliptic curve cryptography (ECC). The response may, for example, also depend on a cryptographic key negotiated between the consumable authentication circuit 201 and the host authentication circuit 202.

With an authentication circuit 104, for example in the form of an authentication chip, on a consumable 101, in the ideal case it is therefore possible that consuming equipment 102 only uses original consumable component units.

However, there is the risk that a manufacturer of a non-original consumable (i.e. the copier) will provide the non-original consumable with a non-original authentication chip (i.e. a clone of the authentication circuit).

In order to make this difficult for the copier, the authentication circuit may be produced with special anti-cloning technologies, for which reverse engineering can be carried out only with difficulty. The main difficulty for the copier in producing a clone is this reverse engineering step. However, as soon as the copier has succeeded in carrying out reverse engineering and, for example, extracting secret keys from the authentication circuit, they can produce a functional clone with a standard chip design flow. The clone may even be produced with a view to cost optimization, optionally by using other technologies, other design libraries, etc.

Exemplary embodiments which provide a second line of defense for the manufacturer, and which make it possible for consuming equipment to be able to distinguish a copied consumable component having a functional clone of an authentication chip from an original consumable component having an original authentication chip, will be described below.

It is in this case assumed that the clone fulfills the original function specification, so that the consuming equipment cannot distinguish the clone of the authentication chip by means of cryptographic protocols or function tests.

According to various exemplary embodiments, however, use is made of the fact that a clone typically behaves differently than an original authentication chip in respect of other properties and metrics. Examples thereof are the following:

the clone has a different size;

the clone has a different layout (placement of memories, analog blocks, profile of electrical lines);

the clone uses a different technology (for example it is manufactured in a different technology);

the clone has a different number of metal layers;

the clone has a slightly different average electricity consumption;

the clone has a different dynamic electricity consumption;

the clone has a slightly different behavior (for example when switching on or when changing to or from sleep mode);

the clone has different electromagnetic emission, etc.

A clone may in principle be identified with the aid of such differences. However, detection of the differences mentioned above in many cases requires laboratory apparatus and manual intervention, for example opening the equipment or part, taking photographs or X-rays, measuring the size, etc.

However, electrical and electromagnetic side channels offer the possibility of implementing an economical sensor on the host side (for example as the consuming equipment 202), which can register sensor data that indicate anomalies, i.e. deviations from the typical behavior of the original authentication circuit. However, the detection of anomalies on the basis of the sensor data is nontrivial because of random variations of the original parts (i.e. of the original authentication chips) and ambient noise, for example noise in the consuming equipment or the consumable component.

Figure 3:
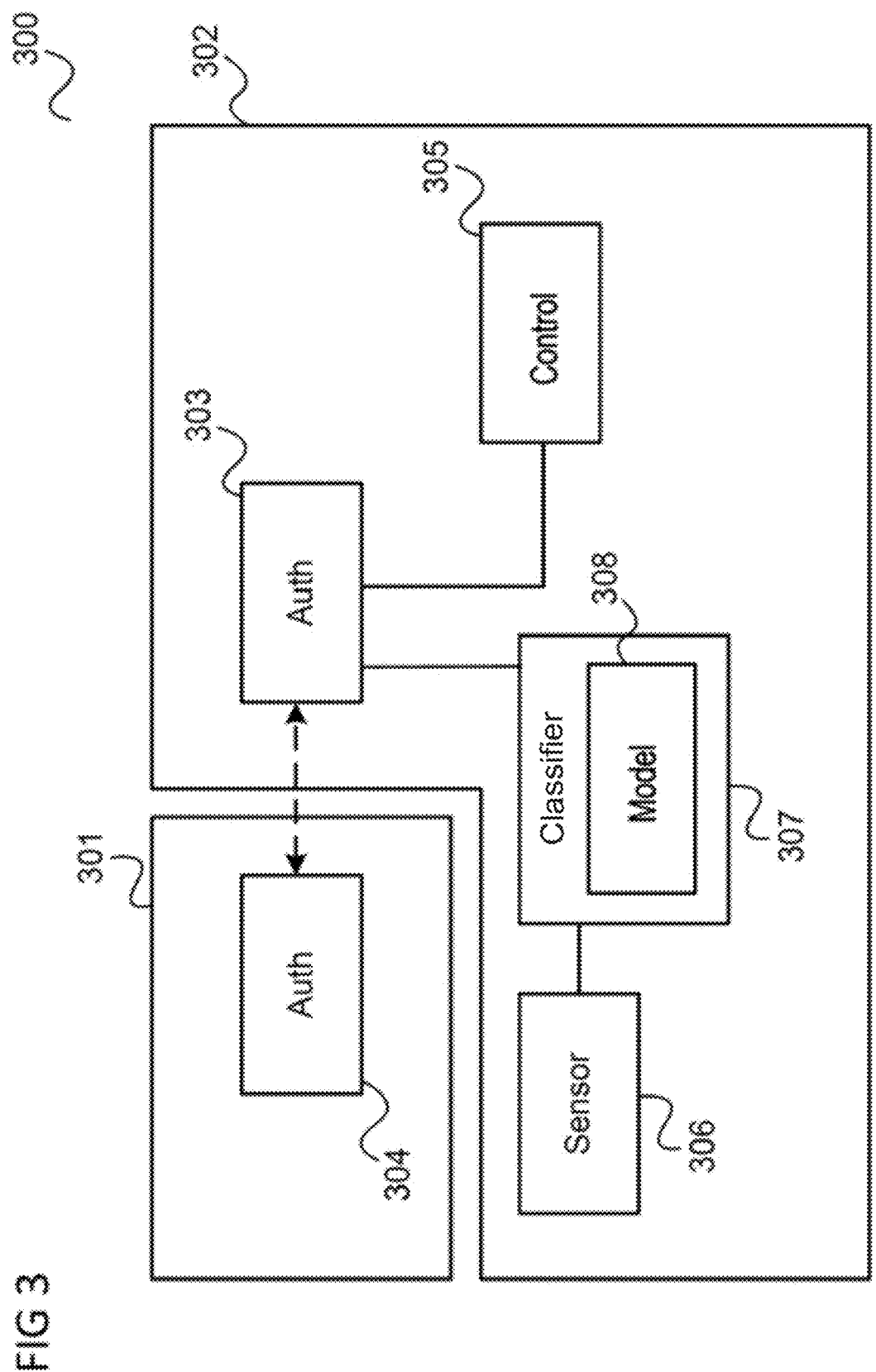
FIG. 3 shows a consumable arrangement according to an embodiment.

According to various embodiments, the host is therefore supplemented not only with a sensor but also with a reliable classification circuit, as is represented in FIG. 3.

FIG. 3 shows a consumable arrangement 300 comprising a consumable 301 and consuming equipment 302 according to an embodiment.

As described with reference to FIG. 1, the consuming equipment 302 comprises a host authentication circuit 303, against which a consumable authentication circuit 304 must be authenticated. The consuming equipment 302 comprises a control device 305, which allows operation of the consuming equipment 302 (also referred to as the host) with the consumable 301 only if the consumable 301 has successfully been authenticated by means of a consumable authentication circuit 304 with the host authentication circuit 303 of the consuming equipment 302.

In contrast to the consumable arrangement 100 of FIG. 1, the consuming equipment 302 additionally comprises a sensor 306 which registers sensor data that describes a physical behavior of the consumable authentication circuit 201, i.e. for example a current sensor or a sensor for electromagnetic side channels (which may measure temperature, electromagnetic radiation, light, etc.). The consuming equipment 302 furthermore comprises a classification circuit 307 which can distinguish a cloned consumable authentication circuit from an original consumable authentication circuit with the aid of the registered sensor data and communicates the result of this decision (i.e. the classification of the consumable authentication circuit) to the host authentication circuit 303. The host authentication circuit 303 only allows use of the consumable 301 if the classification circuit 307 classifies the consumable authentication circuit 304 as an original consumable authentication circuit 304 with the aid of the sensor data.

The sensor 306 and the classification circuit 307 in this way provide a second line of defense against copying of the consumable component, which intervenes when the first line of defense, the protection against copying by the authentication of the consumable authentication circuit 304 (as described with reference to FIG. 2) has been broken through by cloning the consumable authentication circuit 304. By the second line of defense, the lifetime of the consumable with respect to its security can be extended. It furthermore makes it possible to save costs in the consumable authentication circuit 304, since it is possible to use a less expensive consumable authentication circuit, which for example comprises only few measures against reverse engineering or is based on an older technology that offers restricted security.

The classification circuit 307 may be configured at least partially in software, i.e. the host authentication circuit 303 may comprise a programmable processor which executes a corresponding program for the classification.

The sensor 306, the classification circuit 307, the host authentication circuit 303, and/or the control 305 may be provided together on a chip (for example a host controller). Moreover, although not shown in the Figures for purposes of brevity, one or more of the sensor 306, the classification circuit 307, the host authentication circuit 303, and/or the control 305 may comprise or otherwise access a computer readable storage-medium. This computer readable storage medium may additionally or alternatively be provided as part of the host controller that includes each of the components and/or as a separate (e.g. external) computer-readable storage medium. In any event, the computer-readable storage medium may include computer-readable instructions that, when executed by one or more components of the consuming equipment 302 (e.g. the control 305), enable the consuming equipment 302 to facilitate the authentication procedure(s) with respect to any of the embodiments as discussed herein. Thus, the computer-readable storage medium may further contain or otherwise access any suitable type of data to support the functionality of the embodiments as described herein. For instance, the computer-readable storage medium may store model parameter data that specify a trained machine learning model that is trained to classify consumable components into originals and copies (e.g. unauthorized reproductions, non-originals, replicas, fakes, forgeries, etc.) with the aid of sensor data that describe the physical behavior of authentication chips of the consumable components, as discussed herein. To do so, the computer-readable storage medium may be implemented, for instance, as any suitable type of computer storage (e.g. volatile or non-volatile memory) to facilitate this functionality, including known types.

The classification circuit 307 may also be regarded as part of the host authentication circuit 303, which as the case may be is configured in the form of an integrated circuit (i.e. as a chip) or a plurality of integrated circuits (i.e. a plurality of chips).

In order to be able to distinguish reliably cloned authentication circuits from original authentication circuits, according to various embodiments the classification circuit 307 implements a machine learning model 308 that is trained to distinguish cloned authentication circuits from original authentication circuits with the aid of sensor data. One example thereof is a neural network, although other machine learning models, for example a polyhedral classifier, are also suitable for the classification.

The machine learning model 308 may be trained according to a machine learning method (i.e. a training method) by using training data with a multiplicity of training data sets, which respectively comprise sensor data and an associated correct classification (ground truth). This is for example done before delivery of the consuming equipment, and the classification circuit is then configured correspondingly, although it may also be done afterwards by installing corresponding program instructions.

For example, the consuming equipment 302 is thus provided with a sensor 306 (i.e. a measuring device) for the electricity consumption of the consumable authentication circuit 304. In practice, for example, a measurement quantity is registered and recorded over time, for example by means of a voltage sensor, current sensor, or any suitable sensor for measuring an electromagnetic field.

The manufacturer (of the original consumable component and/or of the consuming equipment) characterizes the original consumable authentication chip with respect to dynamic variations of the measurement quantity (for example the power trace) in a model construction phase for the machine learning model 308. The noise is also taken into account for the machine learning model 308.

The information of the measurement quantity for all available clones is used to maximize the distinguishing capability of the machine learning model 308 (by training the machine learning model 308 to distinguish, i.e. to classify, clones and originals correctly). The measurements (on clones and originals to generate the training data) in the model construction phase may be carried out in a laboratory environment with high-resolution sensors instead of the sensor 306 of the consuming equipment, which for example has only a limited measurement capability. A result of the measurements is, for example, a dynamic power model for the consumable authentication circuit, which may be embedded into the classification circuit and/or used for its configuration. For example, it may be used to generate training data for the machine learning model 308.

During operation in the field, the consuming equipment dynamically records the measurement quantity. The resulting profile (power trace) is classified by the classification circuit. This may be regarded as calibration with the dynamic power model for the consumable authentication circuit.

If the classification circuit detects a clone, corresponding measures are implemented. For example, when detecting that the consumable component authentication circuit 304 is a clone, the host component authentication circuit 303 prevents use of the consumable component 301.

Figure 4:
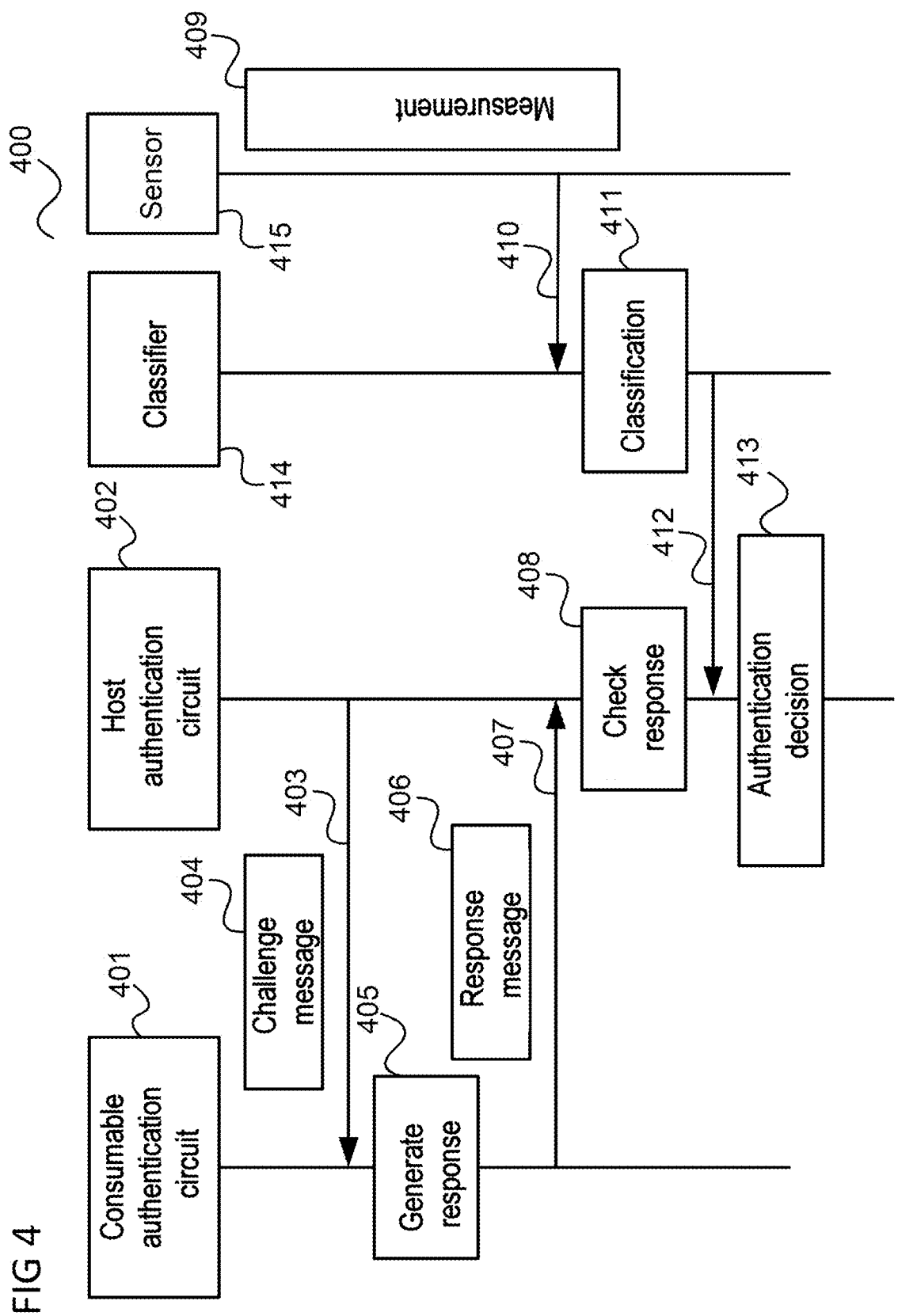
FIG. 4 shows a flowchart of the authentication of a consumable authentication circuit with a host authentication circuit according to an embodiment.

FIG. 4 shows a flowchart 400 of the authentication of a consumable authentication circuit 401 with a host authentication circuit 402 according to an embodiment.

The consumable authentication circuit 401 and the host authentication circuit 402 carry out an authentication method (with a challenge 404 and a response 406) in 403 to 408 as described with reference to FIG. 2.

During at least a part of the conduct of the authentication method, a sensor 415, corresponding to the sensor 306, carries out a measurement 409 of the power consumption (or radiation, etc.) of the consumable authentication circuit.

The measurement result is delivered in 410 to a classifier 414, corresponding to the classification circuit 307.

In 411, the classifier 414 carries out a classification of the consumable authentication circuit 401 (into the classes "original" and "clone") and transmits the classification result in 412 to the host authentication circuit 402, which decides in 413 whether the consumable is approved. It approves the consumable for use with the consuming equipment if the response to the challenge is correct and the classifier 414 has classified the consumable authentication circuit as original.

Further measures (or other measures) may be implemented if a clone is detected. The nature of the measure depends greatly on the consumable and its functionality. In the case of a copied printer cartridge, for example, the host may inform the customer that their guarantee is invalidated. In the case of a refill cartridge for an inhaler (vaporizer), the inhaler may cease to function because of a possible health risk to the user.

An update functionality may be provided so that an improved classification model 308 can be loaded onto the consumable 302, for example when information relating to new clones is available or modified ambient conditions (for instance due to a printer update) occur.

The consuming equipment 302 may stimulate the consumable authentication circuit 304 with unexpected patterns (i.e. inputs, for example challenges), which cannot be anticipated by a cloner, and measure the behavior of the consumable authentication circuit 304 when processing these patterns. In this way, the probability of distinguishing between an original and a clone may be increased. Stimuli changes and correspondingly modified classification models may be loaded onto the consuming equipment 302 (for example by means of updating as mentioned above), so as to hinder the copier in learning to produce clones which are classified as originals.

Measurements (for example power trace measurements) may be carried out in various phases of the communication or processing:
start phase: the focus is in this case on dynamic differences of the current when monitoring for example the RAM (random access memory), the nonvolatile memory, the electricity supply, analog parts;
during the authentication (as described with reference to FIG. 4): the focus is in this case on dynamic differences when executing cryptographic algorithms;
during memory write cycles;
during memory read cycles, etc.

The classification circuit 307 (which may for example be adapted to control the sensor 306 in respect of when and/or how it measures) may modify its behavior and change over between access to measurements in different phases. This may again hinder the copier in learning to produce clones which are classified as originals.

For example, the consumer device 301 evaluates sensor data (i.e. it carries out the classification and authentication) from a phase A during operation. Provision may, however, be made for it to switch over to a classification based on sensor data from one or more further phases B (C, D, . . . etc.), i.e. sensor data measured in another operating phase. To this end, it may already contain classification models for the further phases, although it initially does not use them. The switchover may take place by means of various mechanisms, for example:
triggered for example by means of a firmware update from the manufacturer (for example in response to a hack);
by means of time control, for example another classifier (for example another classification model) (which a possible copier has not yet been able to observe) is switched over to after x operating hours, etc.

Furthermore, provision may also be made that the consumer device 302 not only evaluates the sensor data (analog measurement signals) in the normal operating mode for some phase or other (for instance in the start phase, during a crypto operation, etc., see the list above) and carries out the classification with the ML model constructed for this time window, but also drives the consumable 301 in a "false" (i.e. not occurring during normal operation) sequence and carries out the classification on the basis of the response of the consumable in this situation.

As mentioned above, provision may be made for the classification model 308 to be updated, for example by means of a firmware update. This may have the following features:
another hitherto unused sensor is activated;
another time phase is evaluated (for example sensor data from another phase are used as the basis of the classification);
a modified, for example more accurate model or another ML classification model is used, etc.

In order to implement the sensor 306 and/or to convert an analog sensor voltage or an analog sensor current, which reflects a physical behavior of the consumable authentication circuit, an analog/digital converter is for example provided on the consuming equipment 302. It may be provided on the same chip or externally to the other components 303, 305, 306 307. Different implementation variants will be described below with reference to FIG. 5 to FIG. 8.

Figure 5:
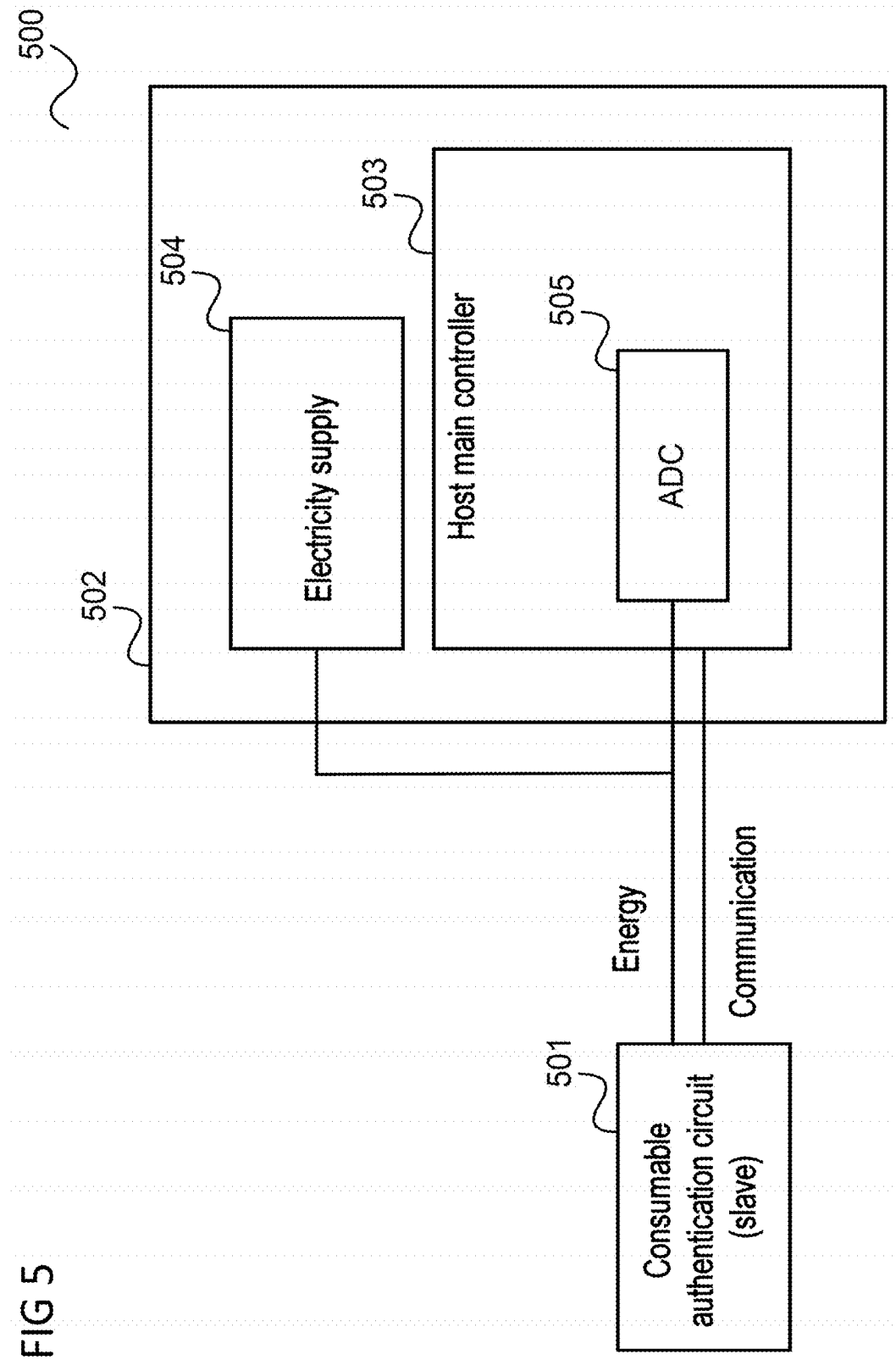
FIG. 5 shows an arrangement having a consumable authentication circuit and consuming equipment with an on-chip analog/digital converter according to an embodiment.

FIG. 5 shows an arrangement 500 having a consumable authentication circuit 501 (slave) and consuming equipment 502 (host), in which the consuming equipment comprises a control chip 503 and an electricity supply 504. The chip implements for example the classifier 307, the host authentication circuit 303, and the control 305.

An analog/digital converter 505 is jointly provided on the chip 503. The analog/digital converter 505 registers, for example, a power consumption of an authentication circuit of the consumable 501 (from electrical energy delivered by the electricity supply) and delivers this as a measurement to the control chip 503.

Figure 6:
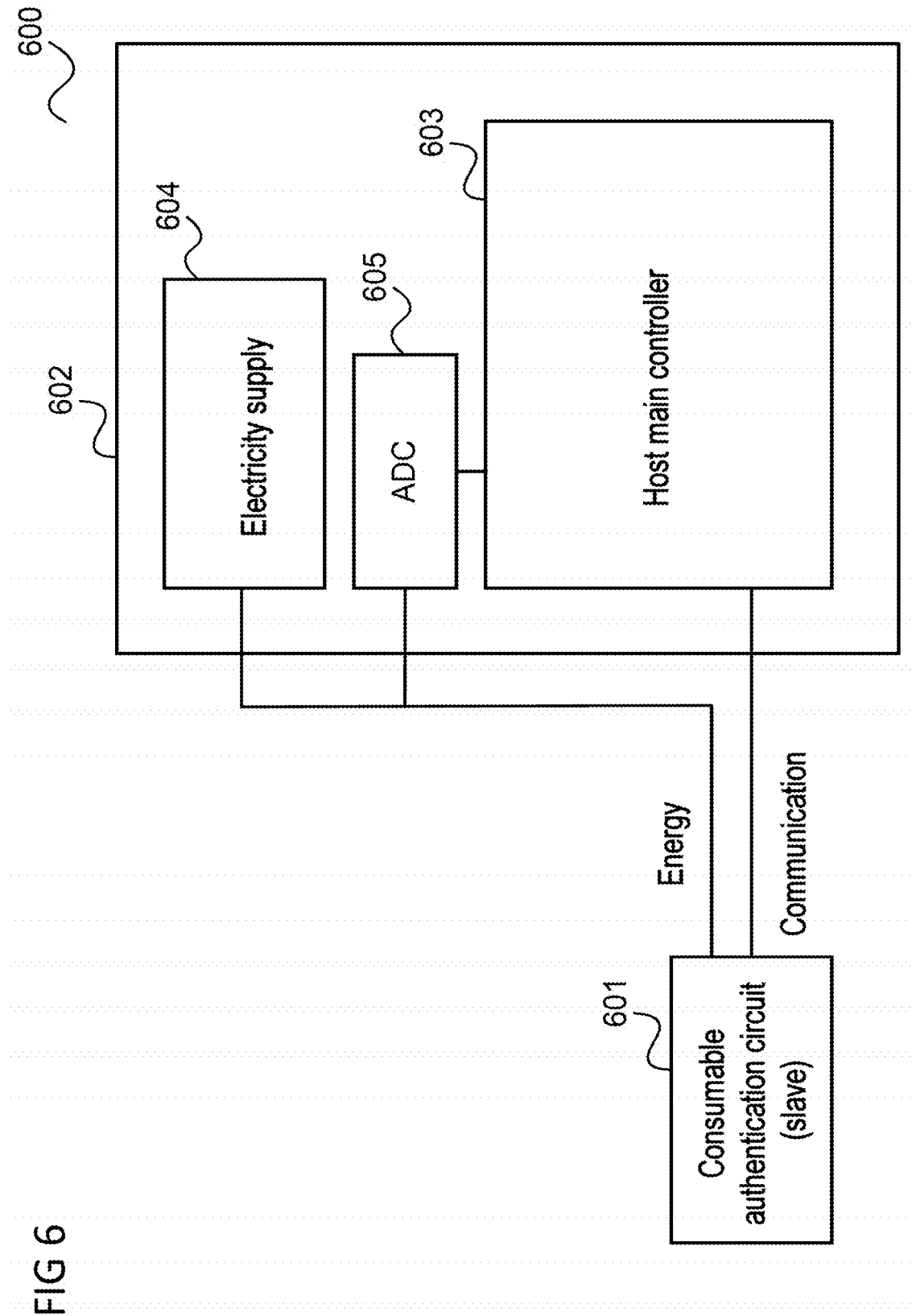
FIG. 6 shows an arrangement having a consumable authentication circuit and consuming equipment with a chip-external analog/digital converter according to an embodiment.

FIG. 6 shows an arrangement 600 having a consumable authentication circuit 601 (slave) and consuming equipment 602 (host), in which the consuming equipment comprises a control chip 603 and an electricity supply 604. The chip implements for example the classifier 307, the host authentication circuit 303, and the control 305.

An analog/digital converter 605 is provided externally to the chip 603. The analog/digital converter 605 registers, for example, a power consumption of an authentication circuit of the consumable 601 (from electrical energy delivered by the electricity supply) and delivers this as a measurement to the control chip 603.

Figure 7:
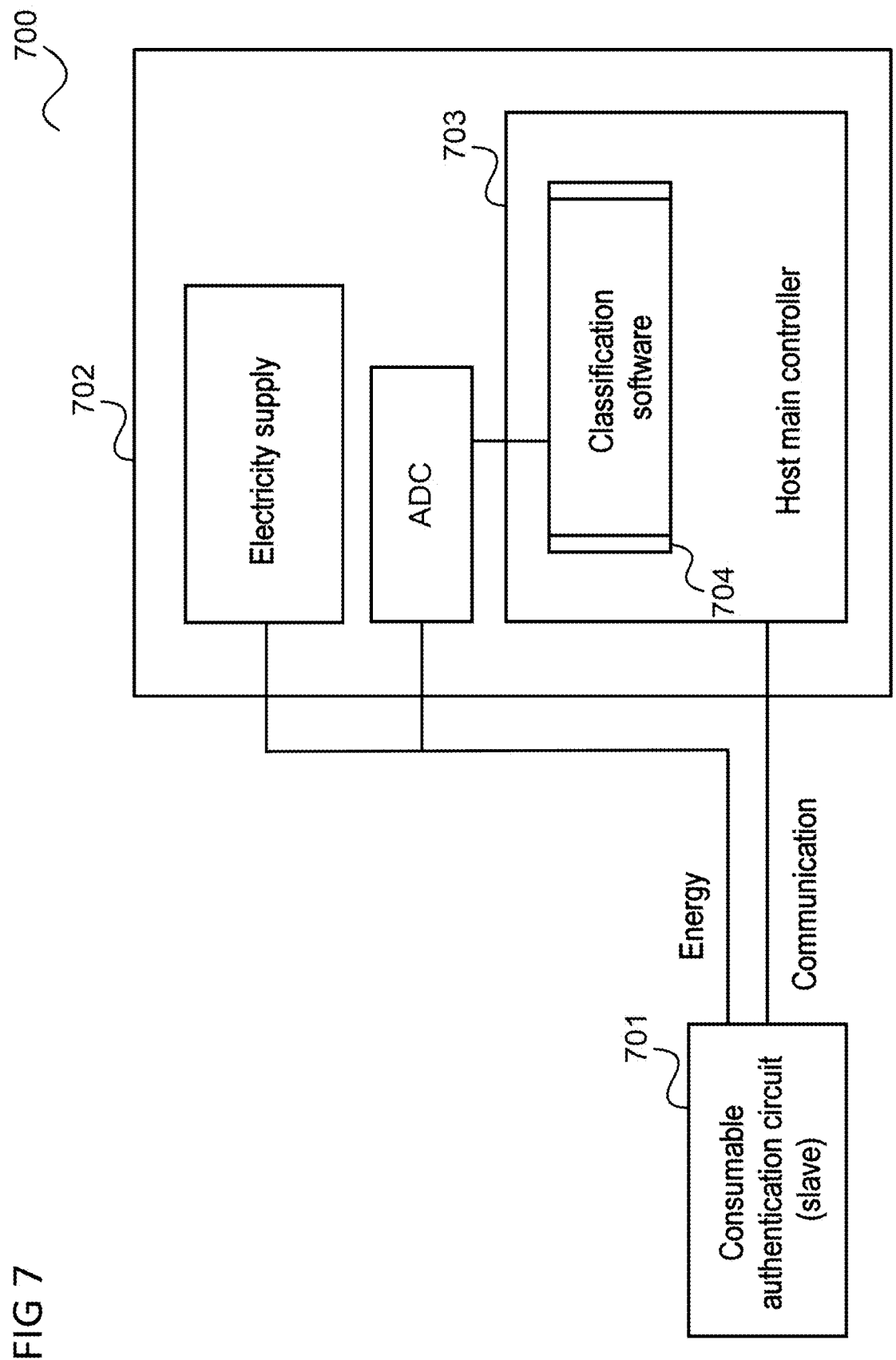
FIG. 7 shows an arrangement having a consumable authentication circuit and consuming equipment, in which the control chip of the consumable comprises an application processor that executes classification software.

FIG. 7 shows an arrangement 700 having a consumable authentication circuit 701 (slave) and consuming equipment 702 (host), in a similar way to FIG. 6, in which the control chip 703 of the consumable 702 comprises an application processor 704 that executes classification software (and thus implements the classification circuit 307).

Figure 8:
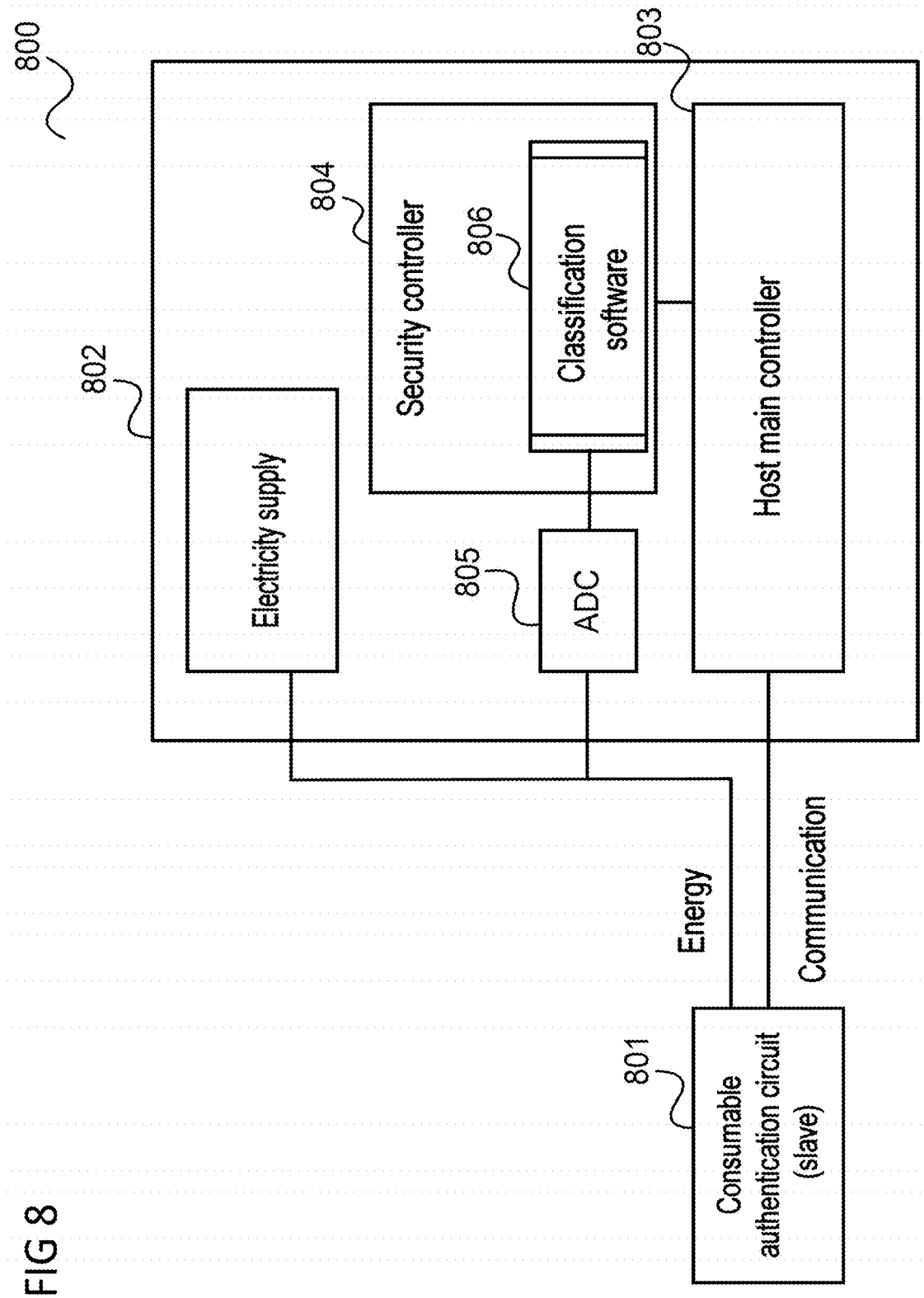
FIG. 8 shows an arrangement having a consumable authentication circuit and consuming equipment, in which the consuming equipment additionally comprises a microprocessor that executes classification software according to an embodiment.

FIG. 8 shows an arrangement 800 having a consumable authentication circuit 801 (slave) and consuming equipment 802 (host), in a similar way to FIG. 6, but in which the consuming equipment 802 comprises, in addition to the control chip 803, a microcontroller 804 that is connected to the control chip 803 and executes classification software 806 (and thus implements the classification circuit 307). Correspondingly, the analog/digital converter 805 delivers the power consumption registered by it to the microcontroller 804, which transmits the classification result to the control chip 803. The microcontroller 804 is, for example, a security controller.

In a further variant, the security controller on the host side has an embedded analog/digital converter. This increases the security since an attacker cannot pick up or replay the communication between the analog/digital converter and the security controller.

Figure 9:
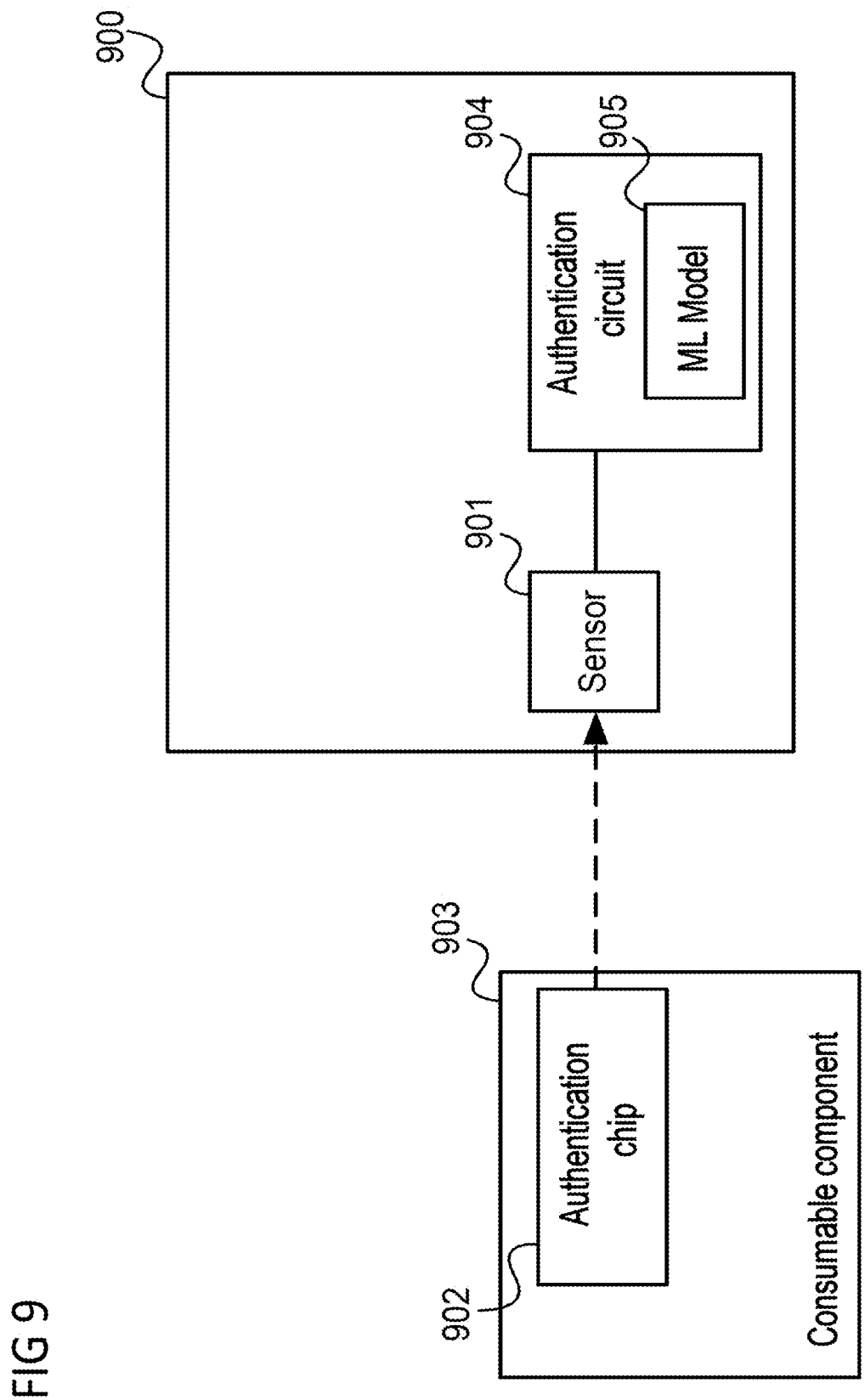
FIG. 9 shows a consumer device according to an embodiment.

In summary, according to various embodiments a consumer device as represented in FIG. 9 is provided.

FIG. 9 shows a consumer device (i.e. consuming equipment) 900 according to one embodiment.

The consumer device 900 comprises a sensor 901, which is adapted to register sensor data that describe a physical behavior of an authentication chip 902 of a consumable component 903 (i.e. of a consumable).

The consumer device 900 furthermore comprises an authentication circuit 904, which is adapted to implement a machine learning model 905 that is trained to classify consumable components with the aid of sensor data that describes the physical behavior of authentication chips of the consumable components into originals and copies. The authentication circuit 904 is further adapted to deliver the registered sensor data to the machine learning model and to authorize (e.g. to approve) the use of the consumable component by the consumer device depending on whether the machine learning model classifies the consumable component as original.

According to various exemplary embodiments, in other words, a machine learning model is trained to distinguish original authentication circuits (typically in the form of integrated circuits, i.e. chips) from copied authentication circuits, i.e. to carry out a classification of a given authentication circuit. As input data, the model receives sensor data that characterize the behavior of the given authentication circuit. These are therefore not data transmitted by the authentication circuit in the scope of an authentication method, but data which characterize further information that is emitted by the authentication circuit in a way other than the communication for authentication. The sensor data therefore contain information that is transmitted via one or more side channels (in addition to the communication channel between the consumable authentication chip and the authentication circuit of the consuming equipment) from the consumable authentication chip to the authentication circuit of the consuming equipment.

The components of the consumer device, e.g. the authentication circuit, may be formed by one or more circuits. In one embodiment, a "circuit" is intended to be understood as any entity which implements a logic, and which may be hardware, software, firmware or a combination thereof. In an embodiment, therefore, a "circuit" may be a hard-wired logic circuit or a programmable logic circuit, for example a programmable processor, for example a microprocessor. A processor that executes software, e.g. any type of computer program, for instance a computer program in programming code for a virtual machine, may also be understood as a "circuit". In an embodiment, any kind of implementation of the functions described herein may be understood as a "circuit".

According to an embodiment, a method as represented in FIG. 10 is provided. FIG. 10 shows a flowchart 100 which illustrates a method for authenticating a consumable component in a consumer device according to an embodiment.

In 1001, sensor data that describe a physical behavior of an authentication chip of a consumable component are registered.

In 1002, the registered sensor data are delivered to a machine learning model which is trained to classify consumable components into originals and copies with the aid of sensor data that describe the physical behavior of authentication chips of the consumable components.

In 1003, the use of the consumable component by the consumer device is authorized (i.e. approved) depending on whether the machine learning model classifies the consumable component as original.

EXAMPLES

Various exemplary embodiments will be specified below.

Exemplary embodiment 1 is a consumer device as described with reference to FIG. 9.

Exemplary embodiment 2 is a consumer device according to exemplary embodiment 1, wherein the sensor is adapted to register sensor data that describe the physical behavior of the authentication chip of the consumable component during the generation of authentication information requested from the consumable component.

Exemplary embodiment 3 is a consumer device according to exemplary embodiment 1 or 2, wherein the sensor is adapted to register sensor data that describe the physical behavior of the authentication chip during memory accesses.

Exemplary embodiment 4 is a consumer device according to one of exemplary embodiments 1 to 3, wherein the sensor data are side channel measurement data.

Exemplary embodiment 5 is a consumer device according to one of exemplary embodiments 1 to 4, wherein the sensor is adapted to register a voltage of the authentication chip, a current drawn by the authentication chip, an electromagnetic field radiated by the authentication chip and/or other side channel data, for example temperature, electromagnetic radiation and light.

Exemplary embodiment 6 is a consumer device according to one of exemplary embodiments 1 to 5, wherein the machine learning model is a neural network.

Exemplary embodiment 7 is a consumer device according to one of exemplary embodiments 1 to 6, wherein the consumer device is a printer, a vaporizer, battery-operated electrical equipment or a vehicle.

Exemplary embodiment 8 is a consumer device according to one of exemplary embodiments 1 to 7, furthermore comprising a transmitter which is adapted to send a request for authentication information to the consumable component, and a receiver which is adapted to receive authentication information from the consumable component, and wherein the authentication circuit is adapted to authorize the use of the consumable component by the consumer device depending on whether the authentication information corresponds to predetermined reference authentication information.

Exemplary embodiment 9 is a consumer device according to exemplary embodiment 8, wherein the transmitter and the receiver are adapted respectively to send and receive the request and the authentication information via at least one first communication channel, and the sensor is adapted to register sensor data that represent information which is transmitted by the consumable component via a communication channel other than the at least one first communication channel.

Exemplary embodiment 10 is a consumer device according to one of exemplary embodiments 1 to 9, wherein the sensor comprises at least one sensor from a group consisting of an optical sensor, a magnetic sensor, an inductive sensor, a capacitive sensor, a temperature sensor, a current sensor, a voltage sensor, an acceleration sensor, a vibration or oscillation sensor, and a chemical sensor.

Exemplary embodiment 11 is a consumer device according to one of exemplary embodiments 1 to 10, comprising an energy supply which is adapted to supply the consumable component with energy via an energy supply line, the physical behavior being a power consumption behavior of the consumable component via the energy supply line.

Exemplary embodiment 12 is a consumer device according to exemplary embodiment 11, wherein the sensor is coupled to the energy supply line in order to register the power consumption of the consumable component via the energy supply line.

Exemplary embodiment 13 is a consumer device according to one of exemplary embodiments 1 to 12, wherein the sensor is adapted to register an analog measurement signal, and comprising an analog/digital converter which is adapted to convert the analog measurement signals into digital sensor data and deliver them to the authentication circuit.

Exemplary embodiment 14 is a method for authenticating a consumable component in a consumer device as described with reference to FIG. 10.

Exemplary embodiment 15 is a method according to exemplary embodiment 14, furthermore comprising training of the machine learning model, comprising registering, for each consumable component of a multiplicity of consumable components, which are respectively classified as original consumable components or as copied consumable components, of sensor data that describe a physical behavior of an authentication chip of the consumable component, and training of the machine learning model by using the sensor data registered for the multiplicity of consumable components and the classification of the multiplicity of consumable components as training data.

Exemplary embodiment 16 is a method according to exemplary embodiment 15, wherein the training of the machine learning model by adaptation of parameters of the machine learning model is carried out in such a way as to increase the capability of the machine learning model to predict on the basis of respective registered sensor data whether a consumable component of the multiplicity of consumable components is classified as an original consumable component or a copied consumable component.

Exemplary embodiment 17 is a method according to one of exemplary embodiments 14 to 16, comprising registering of sensor data that describe the physical behavior of the authentication chip of the consumable component during the generation of authentication information requested from the consumable component.

Exemplary embodiment 18 is a method according to one of exemplary embodiments 14 to 17, comprising registering of sensor data that describe the physical behavior of the authentication chip of the consumable component during memory accesses.

Exemplary embodiment 19 is a method according to one of exemplary embodiments 14 to 17, wherein the sensor data are side channel measurement data.

Exemplary embodiment 20 is a method according to one of exemplary embodiments 14 to 19, comprising registering of a voltage of the authentication chip, a current drawn by the authentication chip, an electromagnetic field radiated by the authentication chip and/or other side channel data, for example temperature, electromagnetic radiation and light.

Exemplary embodiment 21 is a method according to one of exemplary embodiments 14 to 20, wherein the machine learning model is a neural network.

Exemplary embodiment 22 is a method according to one of exemplary embodiments 14 to 21, wherein the consumer device is a printer, a vaporizer, battery-operated electrical equipment or a vehicle.

Exemplary embodiment 23 is a method according to one of exemplary embodiments 14 to 22, furthermore comprising sending of a request for authentication information to the consumable component, reception of authentication information from the consumable component, and authorization of the use of the consumable component by the consumer device depending on whether the authentication information corresponds to predetermined reference authentication information.

Exemplary embodiment 24 is a method according to exemplary embodiment 23, comprising sending and reception respectively of the request and the authentication information via at least one first communication channel, and registering of sensor data that represent information which is transmitted by the consumable component via a communication channel other than the at least one first communication channel.

Exemplary embodiment 25 is a method according to one of exemplary embodiments 14 to 24, comprising registering of the sensor data by means of a sensor which comprises at least one sensor from a group consisting of an optical sensor, a magnetic sensor, an inductive sensor, a capacitive sensor, a temperature sensor, a current sensor, a voltage sensor, an acceleration sensor, a vibration or oscillation sensor, and a chemical sensor.

Exemplary embodiment 26 is a method according to one of exemplary embodiments 14 to 25, comprising supplying of the consumable component with energy via an energy supply line, the physical behavior being a power consumption behavior of the consumable component via the energy supply line.

Exemplary embodiment 27 is a method according to one of exemplary embodiments 14 to 26, comprising registering of an analog measurement signal, conversion of the analog measurement signal into digital sensor data and delivery of the digital sensor data to the authentication circuit.

Exemplary embodiment 28 is a computer-readable storage medium comprising model parameter data which specify a trained machine learning model that is trained to classify consumable components into originals and copies with the aid of sensor data that describe the physical behavior of authentication chips of the consumable components.

It should be noted that features which are described in connection with one exemplary embodiment may also be used in combination with all other exemplary embodiments so long as they do not conflict with the other exemplary embodiment. In particular, all exemplary embodiments which are described for the consumer device and the method for authenticating a consumable component may be used in combination with the computer-readable storage medium.

Although the disclosure has been presented and described primarily with reference to particular embodiments, it should be understood by those who are experienced in the technical field that many modifications may be made thereto in respect of configuration and details, without departing from the essence and scope of the disclosure as defined by the following claims. The scope of the disclosure is therefore determined by the appended claims, and it is intended that all modifications which fall within the wording or the range of equivalence of the claims are included. For instance, the embodiments described herein are provided in the context of consumable or consumer devices, which are authenticated as being original. However, this is by way of example and not limitation, and the embodiments described herein may be implemented in accordance with any suitable type of device or component, industry, etc., in which it may be useful to distinguish original and copies from one another.

LIST OF REFERENCES 100 consumable arrangement
101 consumable
102 consuming equipment
103 host authentication circuit
104 consumable authentication circuit
105 control device
200 flowchart
201 consumable authentication circuit
202 host authentication circuit
203 flow step
204 challenge message
205 flow step
206 response message
207, 208 flow steps
300 consumable arrangement
301 consumable
302 consuming equipment
303 host authentication circuit
304 consumable authentication circuit
305 control device
306 sensor
307 classification circuit
400 flowchart
401 consumable authentication circuit
402 host authentication circuit
403 flow step
404 challenge message
405 flow step
406 response message
407-413 flow steps
414 classifier
415 sensor
500 arrangement
501 consumable authentication circuit
502 consuming equipment
503 control chip
504 electricity supply
505 analog/digital converter
600 arrangement
601 consumable authentication circuit
602 consuming equipment
603 control chip
604 electricity supply
605 analog/digital converter
700 arrangement
701 consumable authentication circuit
702 consuming equipment
703 control chip
704 application processor
800 arrangement
801 consumable authentication circuit
802 consuming equipment
803 control chip
804 microcontroller
805 analog/digital converter
806 classification software
900 consumer device
901 sensor
902 authentication chip
903 consumable component
904 authentication circuit
905 machine learning model
1000 flowchart
1001 flow steps

What is claimed is:

1. A device, comprising:
a sensor configured to register sensor data that is indicative of a measurement of physical behavior of an authentication chip of a component; and
an authentication circuit configured to:
implement a machine learning model that is trained to classify components into originals and forgeries using sensor data that describe physical behavior of authentication chips of the component;
transmit the registered sensor data to the machine learning model; and
authorize use of the component by the device when the machine learning model classifies the component as an original,
wherein the sensor is configured to register the sensor data during a generation of authentication information requested from the component, and
wherein the sensor data that is registered is separate from the authentication information.

2. The device as claimed in claim 1, wherein the sensor is configured to register sensor data that is indicative of the measurement of the physical behavior of the authentication chip of the component during memory access operations.

3. The device as claimed in claim 1, wherein the sensor data comprises side channel measurement data.

4. The device as claimed in claim 1, wherein the sensor is configured to register at least one of a voltage of the authentication chip, a current drawn by the authentication chip, an electromagnetic field radiated by the authentication chip, or side channel data including at least one of temperature or electromagnetic radiation.

5. The device as claimed in claim 1, wherein the machine learning model is a neural network.

6. The device as claimed in claim 1, wherein the device is a printer, a vaporizer, a battery-operated electrical equipment, or a vehicle.

7. The device as claimed in claim 1, further comprising:
a transmitter configured to transmit a request for the authentication information to the component; and
a receiver configured to receive the authentication information from the component,
wherein the authentication circuit is further configured to authorize the use of the component by the device when the authentication information corresponds to predetermined reference authentication information.

8. The device as claimed in claim 7, wherein the transmitter and the receiver are configured to transmit and receive the request and the authentication information, respectively, via at least one first communication channel, and
wherein the sensor is configured to register sensor data that represent information that is transmitted by the component via a communication channel other than the at least one first communication channel.

9. The device as claimed in claim 1, wherein the sensor comprises at least one of:
an optical sensor;
a magnetic sensor;
an inductive sensor;
a capacitive sensor;
a temperature sensor;
a current sensor;
a voltage sensor;
an acceleration sensor;
a vibration or oscillation sensor; or
a chemical sensor.

10. The device as claimed in claim 1, further comprising:
an energy supply configured to supply the component with energy via an energy supply line,
wherein the physical behavior of the authentication chip is a power consumption behavior of the component via the energy supply line.

11. The device as claimed in claim 10, wherein the sensor is coupled to the energy supply line to register the power consumption of the component via the energy supply line.

12. The device as claimed in claim 1, wherein the sensor is configured to register an analog measurement signal, and further comprising:
an analog/digital converter configured to convert the analog measurement signal into digital sensor data and to transmit the digital sensor data to the authentication circuit.

13. The device of claim 1, wherein the generation of authentication information requested from the component comprises a transmission of a challenge message to the component that results in the device receiving a response message from the component as part of an elliptic curve cryptography (ECC) authentication process.

14. The device of claim 1, further comprising:
an energy supply configured to supply the component with energy via an energy supply line,
wherein the physical behavior of the authentication chip is a power consumption behavior of the component that is based upon the energy supplied to the component via the energy supply line.

15. The device of claim 1, wherein the physical behavior of the authentication chip is a power trace measurement that is performed during different phases of communication or processing of the component.

16. The device of claim 15, wherein the power trace measurement performed via each one of the different phases of communication or processing of the component are different than one another.

17. A method for authenticating a component in a device, comprising:
registering sensor data that is indicative of a measurement of a physical behavior of an authentication chip of the component;
transmitting the registered sensor data to a machine learning model that is trained to classify components into originals and forgeries using sensor data that describe physical behavior of authentication chips of the component; and
authorizing the use of the component by the device when the machine learning model classifies the component as an original,
wherein the sensor data is registered during a generation of authentication information requested from the component, and
wherein the sensor data that is registered is separate from the authentication information.

18. The method as claimed in claim 17, further comprising:
training the machine learning model by:
registering, for each component of a plurality of components that are respectively classified as original components or as forgery components, sensor data that describe a physical behavior of an authentication chip of each of the plurality of components; and
training the machine learning model using (i) the sensor data registered for the plurality of components, and (ii) the classification of the plurality of components, as training data.

19. The method as claimed in claim 18, wherein the training of the machine learning model comprises:
adapting parameters of the machine learning model to increase a capability of the machine learning model to predict, on a basis of respective registered sensor data, whether a component of the plurality of components is classified as an original component or a forgery component.

20. A non-transitory computer-readable storage medium including instructions that, when executed by one or more processors of a device, cause the device to:
register sensor data that is indicative of a measurement of a physical behavior of an authentication chip of a component;
access stored model parameter data, the model parameter data specifying a trained machine learning model that is trained to classify components into originals and forgeries using sensor data that describe the physical behavior of authentication chips of the component associated with the device; and
authorize use of the component by the device when the trained machine learning model classifies the component as an original,
wherein the sensor data is registered during a generation of authentication information requested from the component, and
wherein the sensor data that is registered is separate from the authentication information.

* * * * *